UNITED STATES PATENT OFFICE 2,436,777

ORGANOFLUOROSILANES AND METHOD OF MAKING SAME

Donald E. Pletcher and Howard S. Nutting, Midland, Mich., assignors to The Dow Chemical Company, Midland, Mich., a corporation of Delaware No Drawing. Application May 30, 1945, Serial No. 596,812

10 Claims. (Cl. 260—607)

This invention concerns certain new organo-fluorosilanes and a method of making the same.

The compounds provided by the invention have the general formula:

wherein R represents a hydrocarbon radical, Y represents a member of the group consisting of hydrocarbon radicals and hydrolyzable substituents and Z represents a hydrolyzable substituent. These new compounds contain at least two hydrolyzable groups in the molecule, one of which is fluorine. Other hydrolyzable substituents which may also be attached to the silicon are chlorine, bromine, iodine, fluorine, or hydrocarbonoxy radicals, such as methoxy, ethoxy, propoxy, phenoxy, tolyloxy, benzyloxy, or phenethoxy, etc.

The organo-fluorosilanes having the above general formula are useful for a variety of purposes, e. g. as active ingredients of insecticides, or as agents for the treatment of cotton fabrics and other solid hydrophilic materials to render them hydrophobic. They possess a unique property which renders them particularly suitable for use as starting materials from which a wide variety of other organo-silicon compounds, e. g. organo-siloxanes, may be prepared, viz., one fluorine atom in the molecule is far less reactive toward hydrolyzing agents than are the other hydrolyzable substitutents. Thus, an organo-fluorosilane having the above general formula may be subjected to mild hydrolyzing conditions to effect removal of the hydrolyzable groups other than a single fluorine atom, which hydrolysis is usually accompanied by condensation of the hydrolysis product to form organo-fluorosiloxanes. The fluorine atoms which remain attached to silicon atoms in the organo-fluorosiloxane molecule may subsequently be removed, e. g. by hydrolysis under more vigorous conditions to create further siloxane linkages or by reaction with agents such as metal alcoholates, or metal salts of carboxylic acids, etc., to cause displacement of the fluorine by an organic radical.

The organo-fluorosilanes are preferably prepared by reacting one or more metal fluorides with an organo-silicon chloride or bromide. Among the organo-silicon compounds which may be employed as starting materials are methyl silicon trichloride, dimethyl silicon dibromide, ethyl silicon trichloride, isopropyl silicon tribromide, phenyl silicon trichloride, diphenyl silicon dichloride, phenyl methyl silicon dichloride, naphthyl silicon trichloride, benzyl silicon trichloride, etc. Antimony trifluoride, zinc fluoride, and lead fluoride are preferred as sources of fluorine, but other metal fluorides such as silver fluoride or mercuric fluoride may be employed. They may be added directly to the reaction mixture, or may be prepared in situ, e. g. by the reaction of hydrogen fluoride with the corresponding metal chloride or bromide, etc. The reaction is preferably carried out at a temperature sufficient to vaporize the desired organo-fluorosilane product and the vaporized product is withdrawn as it is formed. The optimum reaction temperature varies with changes in the starting materials employed and the pressure on the reaction system, etc. In some instances the reaction is carried out at atmospheric pressure or thereabout, but the pressures below or above atmospheric may be employed. In reacting a metal fluoride with a polychloro- or polybromo-organosilane to produce a halo-fluoro-organosilane, the reaction is advantageously carried out at a moderate temperature under a vacuum sufficient to cause distillation of the desired product as it is formed. The vapors which are withdrawn from the reaction zone may be cooled to condense the product and the latter may be purified in usual ways, e. g. by fractional distillation.

In practice, the metallic fluoride is preferably added in a portionwise manner to the organo-silicon starting material at a temperature of from 25° to 200° C., while maintaining the reaction zone under reduced pressure. The reaction mixture is usually stirred during addition of the reactants. During the reaction, the fluoro-derivatives distill and are condensed, e. g. by passage into a trap cooled with solid carbon dioxide, or liquid air, etc. After the reaction is complete, the distillate is purified and separated into its components by fractional distillation.

The method as just described is also applicable to the treatment of mixtures of non-fluorinated organo-silicon chlorides or bromides to produce mixtures of the corresponding organo-silicon fluorides. In many instances a mixture of organo-silicon chlorides comprises several compounds which cannot be readily separated by fractional distillation due to the proximity of their respective boiling points. Such a mixture may be advantageously reacted with a metallic fluoride, e. g. antimony trifluoride, to produce a mixture of the corresponding organo-silicon fluorides. The latter distill at more widely separated temperatures, and can readily be separated by fractional distillation.

More detailed practice is illustrated by the following examples which are not to be construed as limiting the invention:

Example 1

435 grams (2.4 moles) of antimony trifluoride was added in small portions over a period of 6.5 hours to a mixture of 750 cubic centimeters (4.6 moles) of phenyl silicon trichloride and 1 cubic centimeter of antimony pentachloride while maintaining the resultant mixture under vacuum, i. e. at an absolute pressure of from 6 to 7 millimeters of mercury. During the early stages of the addition the mixture warmed spontaneously, indicating occurrence of an exothermic reaction. The mixture was brought to and maintained at temperatures within the range of from 60° to 80° C. throughout the major part of the reaction period. Products formed during the reaction vaporized from the mixture at vapor temperatures ranging from 40° to 73° C. The vapors were passed to a trap cooled with solid carbon dioxide where the products were condensed. The condensate was fractionally distilled under vacuum. As the fraction distilling within the range of from 41° to 50° C. at 90 mm. absolute pressure, 1.75 moles of phenyl silicon trifluoride were obtained. It is a colorless liquid having a density of 1.204 at 27° C. and boiling at 100–103.5° C./747 mm. It solidifies at from −18° to −19° C. The fraction distilling at a temperature of from 59° to 65° C./50 mm. was further purified by redistillation and 0.44 mole of phenyl chlorodifluorosilane was isolated. It is a colorless liquid boiling at 59–63° C. (principally at 60° C.) at 50 mm. absolute pressure. It has a density of 1.200 at 27° C. Analysis showed 21.6 per cent fluorine, 15.3 per cent silicon and 14.9 per cent chlorine. The fraction distilling at temperatures of from 78° C. to 89° C. at 50 mm. absolute pressure was redistilled. Approximately 0.41 gram mole of phenyl dichloro-fluorosilane was obtained as a colorless liquid distilling at from 83° to 86° C. (principally at 85° C.) at 50 mm. absolute pressure. Its density at 26° C. is 1.274. Analysis showed a fluorine content of 9.8 per cent. Unreacted phenyl silicon trichloride and antimony trichloride were also recovered.

Example 2

By a procedure similar to that described in Example 1, approximately 0.815 mole of lead fluoride was added to and reacted with 1.89 moles of phenyl silicon trichloride, while maintaining the mixture at a temperature of from 158° to 169° C. at an absolute pressure of 350–300 mm. The reaction products were collected and purified as before. There were obtained 0.179 mole of phenyl silicon trifluoride, 0.168 mole of chlorodifluoro-phenyl silane and 0.512 mole of dichlorofluorophenyl silane. Unreacted phenyl silicon trichloride was also recovered.

Example 3

To a mixture of 75 cc. of tertiary butyl chloride and 16.5 cc. (0.268 mole) of absolute ethyl alcohol were added 20 cc. (0.131 mole) of phenyl dichlorofluorosilane. The tertiary butyl chloride was employed as an entraining agent to aid in removing water as it is formed by distilling as a low-boiling azeotrope together with the water. During mixing of the starting materials a reaction occurred with spontaneous warming of the mixture from 23° to 40° C. The mixture was allowed to stand for 20 minutes and then distilled. As the fraction distilling at a temperature of from 64° to 75° C. at 200 mm. absolute pressure, there was obtained a liquid having a viscosity of 20 to 30 centistokes at 25° C., a density of 1.038 at 28° C. and an analysis corresponding to that of $C_6H_5SiF(OC_2H_5)_2$.

Example 4

The procedure of Example 1 was repeated, except that 3.78 moles of ethyl silicon trichloride, 2.26 moles of antimony trifluoride, and 0.5 cc. of antimony pentachloride were employed as the starting materials. The reaction was carried out at a temperature of from 70° to 90° C. and an absolute pressure of 400 mm. The products of reaction were continuously removed and condensed. Subsequent fractional distillation of said condensate yielded the following compounds: Ethyl silicon trifluoride, (1.48 moles), B. P. −3° to 0° C. at 754 mm. absolute pressure; ethyl difluoro-chlorosilane, (0.32 mole) B. P. 26–29° C. (chiefly at 28° C.) at 752 mm. absolute pressure, a liquid having a density of 1.103 at 24° C.; ethyl dichlorofluorosilane, (0.51 mole) B. P. 62–66° C. (chiefly at 64° C.) at 752 mm. absolute pressure, a liquid having a density of 1.151 at 25° C.; and ethyl silicon trichloride and antimony trichloride were also recovered.

Example 5

By procedure similar to that illustrated in the foregoing examples, a mixture of phenyl methyl silicon dichloride and phenyl silicon trichloride was reacted with antimony trifluoride at a pot temperature of from 70° C./150 mm. to 155° C./100 mm. Phenyl methyl silicon difluoride was obtained as a colorless liquid, having a boiling point of 66° C./50 mm. and a density of 1.092 at 26° C. Analysis showed 23.9 per cent fluorine and 17.4 per cent silicon. Phenyl silicon trifluoride was also obtained.

Example 6

By procedure similar to that described in the preceding examples, 2.53 moles of diphenyl silicon dichloride and 4.03 moles of lead fluoride were reacted at a temperature of 145° to 270° C. (chiefly 145–160° C.) and at an absolute pressure of 7 mm. The reaction products were collected and purified as before. As the fraction distilling at 103–103.8° C./5.5 mm., there was obtained difluorodiphenylsilane, a colorless liquid having a pleasant aromatic odor. Its density is 1.151 at 25.5° C. As the fraction distilling at 123–125° C./5.5 mm. there was obtained chlorofluorodiphenyl silane, a colorless liquid having a density of 1.181 at 25.5° C.

Operating in a manner similar to that described in the preceding examples, methyl silicon trichloride may be reacted with lead fluoride to produce methyl silicon trifluoride, methyl difluorochlorosilane and methyl dichlorofluorosilane; isopropyl silicon trichloride may be employed as the starting material to produce isopropyl silicon trifluoride, isopropyl difluorochlorosilane and isopropyl dichlorofluorosilane; octadecyl silicon trichloride may be employed to produce octadecyl silicon trifluoride, octadecyl dichlorofluorosilane, and octadecyl difluorochlorosilane; and phenyl ethyl silicon dichloride may be employed to produce phenyl ethyl silicon difluoride.

Other modes of applying the principle of the invention may be employed instead of those explained, change being made as regards the method or compounds herein disclosed, provided the steps or compounds stated by any of the following claims or the equivalent of such steps or compounds be employed.

We claim:

1. An organo-fluorosilane having the general formula:

wherein R represents an alkyl radical, Y represents an alkyl radical and Z represents a halogen other than fluorine.

2. An organo-fluorosilane having the general formula:

wherein R represents a hydrocarbon radical, Y represents a hydrocarbon radical and Z represents chlorine.

3. An organo-fluorosilane having the general formula:

wherein R represents a hydrocarbon radical, Y represents a halogen, and Z represents a halogen other than fluorine.

4. Ethyl dichlorofluorosilane.

5. Phenyl dichlorofluorosilane.

6. The process for the production of an organo-fluorosilane which comprises reacting a metal fluoride selected from the group consisting of fluorides of antimony, zinc, lead, silver and mercury with an organo-silicon halide which contains a halogen other than fluorine and during the reaction vaporizing an organo-fluorosilane product from the reacting mixture at a vapor pressure, of the organo-fluorosilane, less than atmospheric pressure.

7. The method of treating a mixture of difficultly separable organo-silicon chlorides which comprises reacting said mixture with a metallic fluoride selected from the group consisting of fluorides of antimony, zinc, lead, silver and mercury, during the reaction continuously vaporizing fluorinated products from the reacting mixture at a vapor pressure, of the vaporized fluorinated products, less than atmospheric pressure and redistilling the products to separate the organo-silicon fluorides from one another.

8. An organosilane having attached to the silicon atom at least one hydrocarbon radical and a plurality of halogen atoms, including at least one fluorine atom and one halogen atom other than fluorine.

9. The process for the production of an organosilane having attached to the silicon atom at least one hydrocarbon radical and a plurality of halogen atoms, including at least one fluorine atom and one halogen atom other than fluorine, which process comprises reacting a metal fluoride selected from the group consisting of fluorides of antimony, zinc, lead, silver and mercury with an organosilicon halide containing a halogen other than fluorine and during the reaction continuously withdrawing the vaporous reaction products from the reaction zone at a vapor pressure, of said products, less than atmospheric pressure.

10. The process for the preparation of an organosilane having attached to the silicon atom at least one hydrocarbon radical and a plurality of halogen atoms, including at least one fluorine atom and a halogen atom other than fluorine, which comprises reacting a metal fluoride selected from the group consisting of fluorides of antimony, zinc, lead, silver and mercury with an organosilicon halide containing a halogen other than fluorine, maintaining the reaction mixture at a sub-atmospheric pressure, continuously withdrawing the vaporous reaction products and separating an organo-fluorosilane.

DONALD E. PLETCHER.
HOWARD S. NUTTING.

REFERENCES CITED

The following references are of record in the file of this patent:

UNITED STATES PATENTS

| Number | Name | Date |
|---|---|---|
| 2,238,669 | Wiley | Apr. 15, 1941 |
| 2,286,763 | Rochow | June 16, 1942 |
| 2,380,995 | Rochow | Aug. 7, 1945 |

OTHER REFERENCES

Gierut, "Jour. Am. Chem. Soc.," vol. 58, pages 897–898 (1936).

Flood, "Jour. Am. Chem. Soc.," vol. 55, pages 1735–1736 (1933).

Medoks, "Chemical Abstracts," vol. 32, pages 531 and 5392 (1938).

Beilstein, "Handbuch der Org. Chem.," 4th ed., vol. IV, pages 629–630; ibid., vol. XVI, pages 909–912.

Emeleus and Wilkins, "Jour. Chem. Soc.," (London) 1944, pages 454–456 (published Sept. 1944).